United States Patent
Matsumoto et al.

(10) Patent No.: US 8,860,822 B2
(45) Date of Patent: Oct. 14, 2014

(54) IMAGING DEVICE

(75) Inventors: Tsuyoshi Matsumoto, Tokyo (JP); Mitsuhiro Okazaki, Tokyo (JP)

(73) Assignee: Nikon Corporation, Tokyo (JP)

( * ) Notice: Subject to any disclaimer, the term of this patent is extended or adjusted under 35 U.S.C. 154(b) by 462 days.

(21) Appl. No.: 12/915,412

(22) Filed: Oct. 29, 2010

(65) Prior Publication Data

US 2011/0234821 A1    Sep. 29, 2011

(30) Foreign Application Priority Data

Oct. 30, 2009    (JP) .................. 2009-250336

(51) Int. Cl.
*H04N 5/225*    (2006.01)
*G03B 17/00*    (2006.01)
*H04R 3/00*    (2006.01)

(52) U.S. Cl.
CPC . *G03B 17/00* (2013.01); *H04R 3/00* (2013.01)
USPC ...................... 348/207.99; 348/241

(58) Field of Classification Search
USPC ............................ 348/207.99, 241
See application file for complete search history.

(56) References Cited

U.S. PATENT DOCUMENTS

| | | | |
|---|---|---|---|
| 2005/0152563 A1 | 7/2005 | Amada et al. | |
| 2008/0309786 A1* | 12/2008 | Archibald et al. | 348/222.1 |
| 2009/0147624 A1* | 6/2009 | Hara et al. | 367/131 |
| 2010/0014681 A1 | 1/2010 | Sugiyama | |
| 2011/0096206 A1* | 4/2011 | Okazaki | 348/241 |
| 2012/0026345 A1* | 2/2012 | Osako et al. | 348/207.99 |

FOREIGN PATENT DOCUMENTS

| | | |
|---|---|---|
| JP | A-11-015494 | 1/1999 |
| JP | A-2005-195955 | 7/2005 |
| JP | 2005-244613 * | 9/2005 |
| JP | A-2005-258158 | 9/2005 |
| JP | A-2006-222618 | 8/2006 |
| JP | A-2006-279185 | 10/2006 |
| WO | WO 2008/111462 A1 | 9/2008 |

OTHER PUBLICATIONS

Boll, Steven F., "Suppression of acoustic noise in speech using spectral subtraction," *IEEE Transactions on Acoustics, Speech, and Signal Processing*, vol. ASSP-27, No. 2, pp. 113-120, 1979.

* cited by examiner

*Primary Examiner* — Tuan Ho
*Assistant Examiner* — Fayez Bhuiyan
(74) *Attorney, Agent, or Firm* — Oliff PLC

(57) ABSTRACT

The timing when the operation state of an operation unit is changed is detected by a timing detection unit. A difference between a sound signal on which operation sound is superimposed or is highly likely to be superimposed and a sound signal on which operation sound is not superimposed is calculated based on the timing signal to obtain the operation sound information of the operation unit.

11 Claims, 13 Drawing Sheets

$Y_i$: SPECTRUM OF EACH FRAME
$D_i$: ESTIMATED SPECTRUM
$\alpha_i$: SUBTRACTION COEFFICIENT

IMAGING DEVICE

Priority is claimed on Japanese Patent Application No. 2009-250336, filed Oct. 30, 2009, the disclosure of which is hereby incorporated herein by reference in its entirety.

BACKGROUND

1. Field of the Invention

The present invention relates to an imaging device for subtracting noise from a sound signal.

2. Description of the Related Art

For example, in order to remove continuously generated ambient sound as noise, the noise corresponding to the ambient sound (a noise component included in a sound signal) is calculated and subtracted from the sound signal (e.g., Japanese Patent Application Publication No. 2005-195955A).

SUMMARY

An imaging device is equipped with operation units including lenses and a driving unit for driving the lenses. For example, operation sound of the operation unit may be generated discontinuously (suddenly) as the operation unit is in operation according to user manipulation.

For such discontinuously generated noise, in technology disclosed in Japanese Patent Application Publication No. 2005-195955, only noise corresponding to ambient sound, i.e., continuously generated noise, is calculated from a sound signal, making it difficult to calculate the discontinuously generated noise. It is also difficult to reduce noise generated when an operation unit provided in an imaging device is in operation.

An object of an aspect of the present invention is to provide an imaging device capable of reducing noise generated when an operation unit provided in an imaging device is in operation.

According to an aspect of the present invention, there is provided an imaging device including an imaging unit that images an optical image by an optical system, the imaging device including: a timing signal detection unit that detects a signal indicating a timing when an operation unit is in operation; a sound signal acquisition unit that acquires a sound signal; an estimation unit that obtains, as first sound information, a section of the sound signal including the sound signal when an operation state of the operation unit is changed based on the signal indicating the timing, and calculating operation sound information of the operation unit based on second sound information corresponding to a section of the sound signal before the first sound information and third sound information corresponding to a section of the sound signal after the first sound information; and a processing unit that subtracts the operation sound information from fourth sound information corresponding to the section of the sound signal including the operation sound of the operation unit based on the signal indicating the timing.

According to an aspect of the present invention, it is possible to reduce noise that is generated when the operation unit provided in the imaging device is in operation.

DESCRIPTION OF EMBODIMENTS

Figure 1:
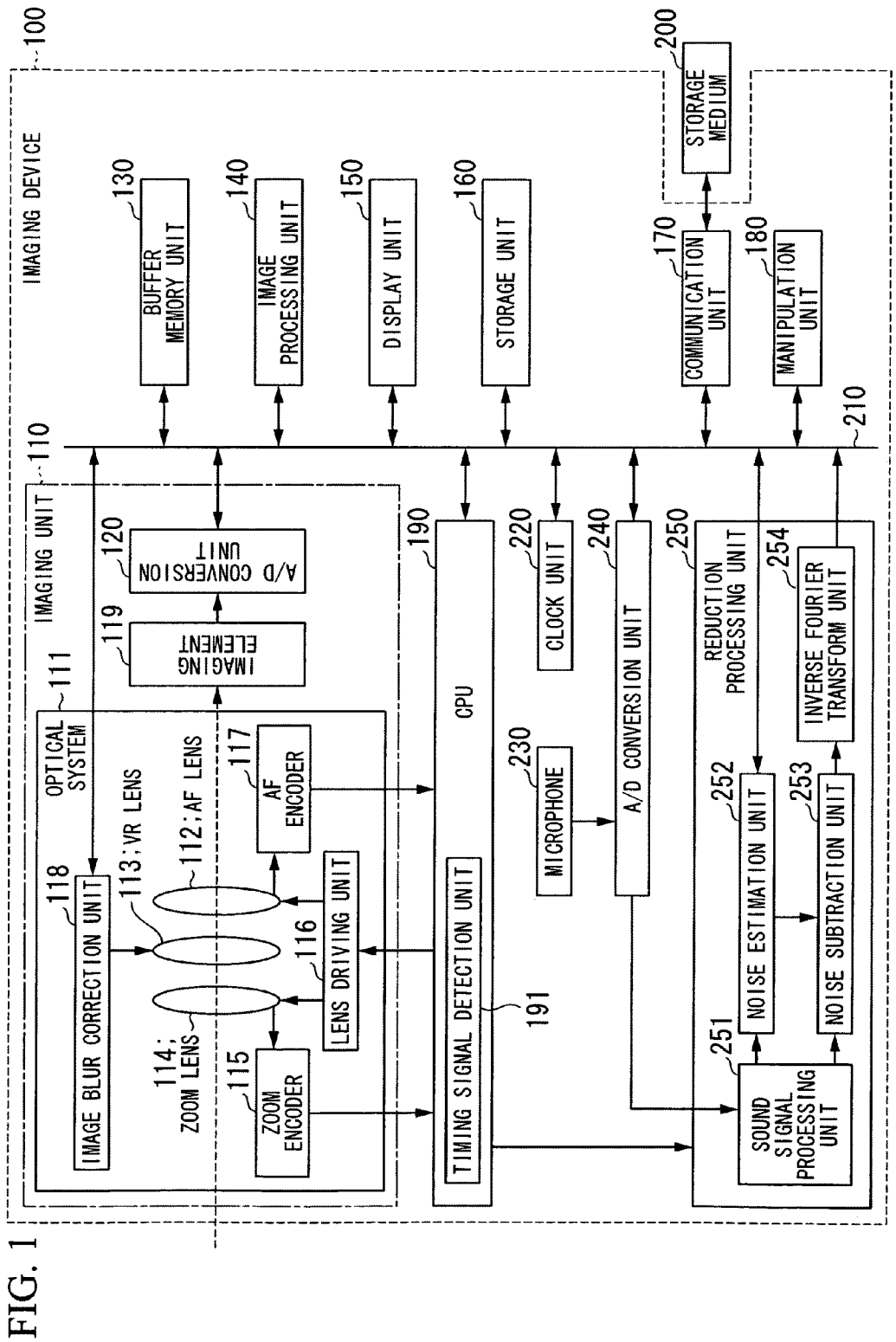
FIG. 1 is a block diagram showing a configuration of an imaging device according to an embodiment of the present invention.

An embodiment of the present invention will be described in detail with reference to the accompanying drawings. In FIG. 1, a block diagram showing a configuration of an imaging device according to the present embodiment is shown.

As shown in FIG. 1, an imaging device 100 acquires an image by an optical system and stores obtained image data in a storage medium 200. The imaging device 100 also reduces noise as operation sound from received sound and stores an obtained sound signal in the storage medium 200.

The imaging device 100 includes an imaging unit 110, a buffer memory unit 130, an image processing unit 140, a display unit 150, a storage unit 160, a communication unit 170, a manipulation unit 180, a CPU 190, a microphone 230, an A/D conversion unit 240, and a reduction processing unit 250.

The imaging unit 110 includes an optical system 111, an imaging element 119, and an analog/digital (A/D) conversion unit 120, and is controlled by the CPU 190 according to a set imaging condition (e.g. an aperture value or an exposure value). Further, the imaging unit 110 generates image data based on an optical image obtained by forming an optical image by the optical system 111 using the imaging element 119 and converting the optical image into a digital signal using the A/D conversion unit 120.

The optical system 111 includes a focus adjustment lens (hereinafter, referred to as an auto focus (AF) lens) 112, a shake correction lens (hereinafter, referred to as a vibration reduction (VR) lens) 113, a zoom lens 114, a zoom encoder 115, a lens driving unit 116, an AF encoder 117, and an image blur correction unit (image blur prevention unit) 118.

The optical system 111 guides an optical image, which is incident from the zoom lens 114 and passes through the zoom lens 114, the AF lens 112, and the VR lens 113 in this order, to a light receiving surface of the imaging element 119.

A drive control signal for controlling positions of the AF lens 112 and the zoom lens 114 is input from the CPU 190 to the lens driving unit 116, and the positions of the AF lens 112 and the zoom lens 114 are controlled according to the drive control signal. When the drive control signal is input from the CPU 190 to the lens driving unit 116 to drive the lens driving unit 116, the AF lens 112 and the zoom lens 114 move (operate).

The zoom encoder 115 detects a zoom position indicating the position of the zoom lens 114 and outputs the zoom position to the CPU 190. The zoom encoder 115 detects a movement of the zoom lens 114 and, for example, outputs, to the CPU 190, a signal having a high level when the zoom lens 114 is moving inside the optical system 111 and a low level when the zoom lens 114 stops. The CPU 190 determines that the time when a timing signal is changed from a high level to a low level and the time when the timing signal is changed from a low level to a high level are times when the operation state of the zoom lens 114 is changed, based on the signal output from the zoom encoder 115.

The AF encoder 117 detects a focus position indicating the position of the AF lens 112 and outputs the focus position to the CPU 190. The AF encoder 117 detects the movement of the AF lens 112 and for example, outputs, to the CPU 190, a signal having a high level when the AF lens 112 is moving inside the optical system 111 and a low level when the AF lens 112 stops. Further, the CPU 190 determines that the time when the timing signal is changed from a high level to a low level and the time when the timing signal is changed from a low level to a high level are times when the operation state of the AF lens 112 is changed, based on the signal output from the AF encoder 117.

The zoom encoder 115 may detect a drive direction of the zoom lens 114 in order to detect the zoom position. Further, the AF encoder 117 may detect a drive direction of the AF lens 112 in order to detect the focus position. The zoom encoder 115 and the AF encoder 117 move as driving mechanisms (e.g. motors, cams and the like) driven by the lens driving unit 116 rotate in clockwise (CW) or counterclockwise (CCW). Accordingly, the zoom encoder 115 and the AF encoder 117 detect that the zoom lens 114 and the AF lens 112 are moving, by detecting the driving direction (here, CW or CCW), respectively.

The image blur correction unit 118 detects an image blur caused by the optical system 111, and drives the VR lens 113 in a direction for canceling the shake. The image blur correction unit 118 outputs, for example, a signal at a high level when the VR lens 113 is being driven, and at a low level when the VR lens 113 is stopped, to the CPU 190. Further, the CPU 190 determines that the time when the timing signal is changed from a high level to a low level and the time when the timing signal is changed from a low level to a high level are times when the operation state of the VR lens 113 is changed, based on the signal output from the image blur correction unit 118.

The imaging element 119 includes, for example, a photo-electric conversion surface, and converts an optical image formed on the light receiving surface into an electrical signal, and outputs the electrical signal to the A/D conversion unit 120.

The imaging element 119 stores image data obtained when a photographing instruction is received via the manipulation unit 180, as image data of a still image or a moving image, in the storage medium 200 via the A/D conversion unit 120. Meanwhile, the imaging element 119 outputs, for example, image data continuously obtained in a state in which the imaging instruction is not received via the manipulation unit 180, as through-the-lens image data, to the CPU 190 and the display unit 150 via the A/D conversion unit 120.

The A/D conversion unit 120 converts the electric signal from the imaging element 119 into a digital signal, and outputs image data as the digital signal to the buffer memory unit 130.

The buffer memory unit 130 temporarily stores the image data acquired by the imaging unit 110. The buffer memory unit 130 also temporarily stores the sound signal according to the target sound received by the microphone 230. Further, the buffer memory unit 130 may store the sound signal according to the target sound, with a target sound receiving time corresponding to a position in the buffer memory unit 130.

The image processing unit 140 performs image processing on the image data temporarily stored in the buffer memory unit 130 by referencing an image processing condition stored in the storage unit 160. The image-processed image data is stored in the storage medium 200 via the communication unit 170. The image processing unit 140 may also perform image processing on the image data stored in the storage medium 200.

The display unit 150 is, for example, a liquid crystal display, and displays the image data obtained by the imaging unit 110, a manipulation screen and the like.

The storage unit 160 stores a judgment condition referenced when a scene judgment is made by the CPU 190, an imaging condition corresponding to each scene judged by the scene judgment, and so on.

The communication unit 170 is connected to the detachable storage medium 200, such as a card memory, and writes, reads, or deletes information (e.g., image data and sound data) to or from the storage medium 200.

The manipulation unit 180 includes, for example, a power switch, a shutter button, a multi-selector (a cross key), or other manipulation keys, and receives a user manipulation input when the manipulation unit 180 is manipulated by a user, and outputs manipulation information according to the manipulation input to the CPU 190.

The CPU 190 determines that the time when manipulation information is input and the time when the operation time ends are times when the operation state of the manipulation unit 180 is changed, with reference to a prescribed operation time (held in the storage unit 160) of the manipulation unit 180 based on the manipulation information.

The storage medium 200 is a storage unit detachably connected to the imaging device 100, and for example, stores the image data which is generated (photographed) by the imaging unit 110 and the sound signal which is sound-signal-processed by the reduction processing unit 250.

The bus 210 is connected to the imaging unit 110, the buffer memory unit 130, the image processing unit 140, the display unit 150, the storage unit 160, the communication unit 170, the manipulation unit 180, the CPU 190, the microphone 230, the A/D conversion unit 240, and the reduction processing unit 250, and transfers, for example, data output from each unit.

The clock unit 220 obtains a date and time and outputs time information indicating the obtained date and time.

The CPU 190 controls the imaging unit 110 according to a set imaging condition (e.g. an aperture value or an exposure value). The CPU 190 generates a drive control signal to drive the lens driving unit 116 based on the zoom position output from the zoom encoder 115 and the focus position output from the AF encoder, and outputs the drive control signal to the lens driving unit 116. An algorithm for generating the drive control signal may be an appropriate algorithm, as necessary.

Further, the CPU 190 includes a timing signal detection unit 191.

The timing signal detection unit 191 detects a timing when the operation state of the operation unit included in the imaging device 100 is changed. Examples of a timing when the operation state is changed include a timing when the operation unit initiates its operation and when the operation of the operation unit is terminated.

For example, the operation unit noted herein is the zoom lens 114, the VR lens 113, the AF lens 112, or the manipulation unit 180 described above, and is a component from which sound is generated (or is likely to be generated) when the component operates or is operated among the components included in the imaging device 100.

Further, the operation unit is a component from which sound generated when the component operates or is operated, is received (or is likely to be received) by the microphone 230 among the components included in the imaging device 100.

The timing signal detection unit 191 may detect a timing when the operation state of the operation unit is changed based on a control signal to operate the operation unit. The control signal causes the driving unit for operating the operation unit to operate the operation unit, or is a signal that drives the driving unit.

For example, the timing signal detection unit 191 may detect the timing when the operation state of the operation unit is changed based on the drive control signal that is input to the lens driving unit 116 or the image blur correction unit (the shake prevention unit) 118 in order to drive the zoom lens 114, the VR lens 113, or the AF lens 112, or based on the drive control signal generated by the CPU 190.

When the CPU 190 generates the drive control signal, the timing signal detection unit 191 may also detect the timing when the operation state of the operation unit is changed, based on a process or a command executed inside the CPU 190.

Alternatively, the timing signal detection unit 191 may detect the timing when the operation state of the operation unit is changed, based on a signal indicating that the zoom lens 114 or the AF lens 112 is driven, which is input from the manipulation unit 180.

Alternatively, the timing signal detection unit 191 may detect the timing when the operation state of the operation unit is changed, based on a signal indicating that the operation unit has been operated.

For example, the timing signal detection unit 191 may detect the timing when the operation unit initiates its operation by detecting that the zoom lens 114 or the AF lens 112 is driven based on the output of the zoom encoder 115 or the AF encoder 117, or may detect the timing when the operation unit terminates its operation by detecting that the zoom lens 114 or the AF lens 112 has stopped.

Alternatively, the timing signal detection unit 191 may detect the timing when the operation unit initiates its operation by detecting that the VR lens 113 is driven based on the output from the image blur correction unit (shake prevention unit) 118, or may detect the timing when the operation unit terminates its operation by detecting that the VR lens 113 has stopped.

The timing signal detection unit 191 may detect the timing when the operation unit is in operation by detecting that the manipulation unit 180 is manipulated based on the input from the manipulation unit 180.

The timing signal detection unit 191 detects the timing when the operation unit included in the imaging device 100 initiates its operation and terminates its operation, and outputs a signal indicating the detected timing to the reduction processing unit 250 (hereinafter, referred to as a timing signal).

The microphone 230 receives an input sound signal and outputs the sound signal to the A/D conversion unit 240. Further, target sound as a reception object is included in the sound signal received by the microphone 230. Operation sound generated when the operation unit is in operation may be superimposed on the target sound.

Here, the sound signal received by the microphone 230 will be described with reference to FIG. 2 in connection with a sound signal obtained when the AF lens 112 is in operation.

Figure 2:
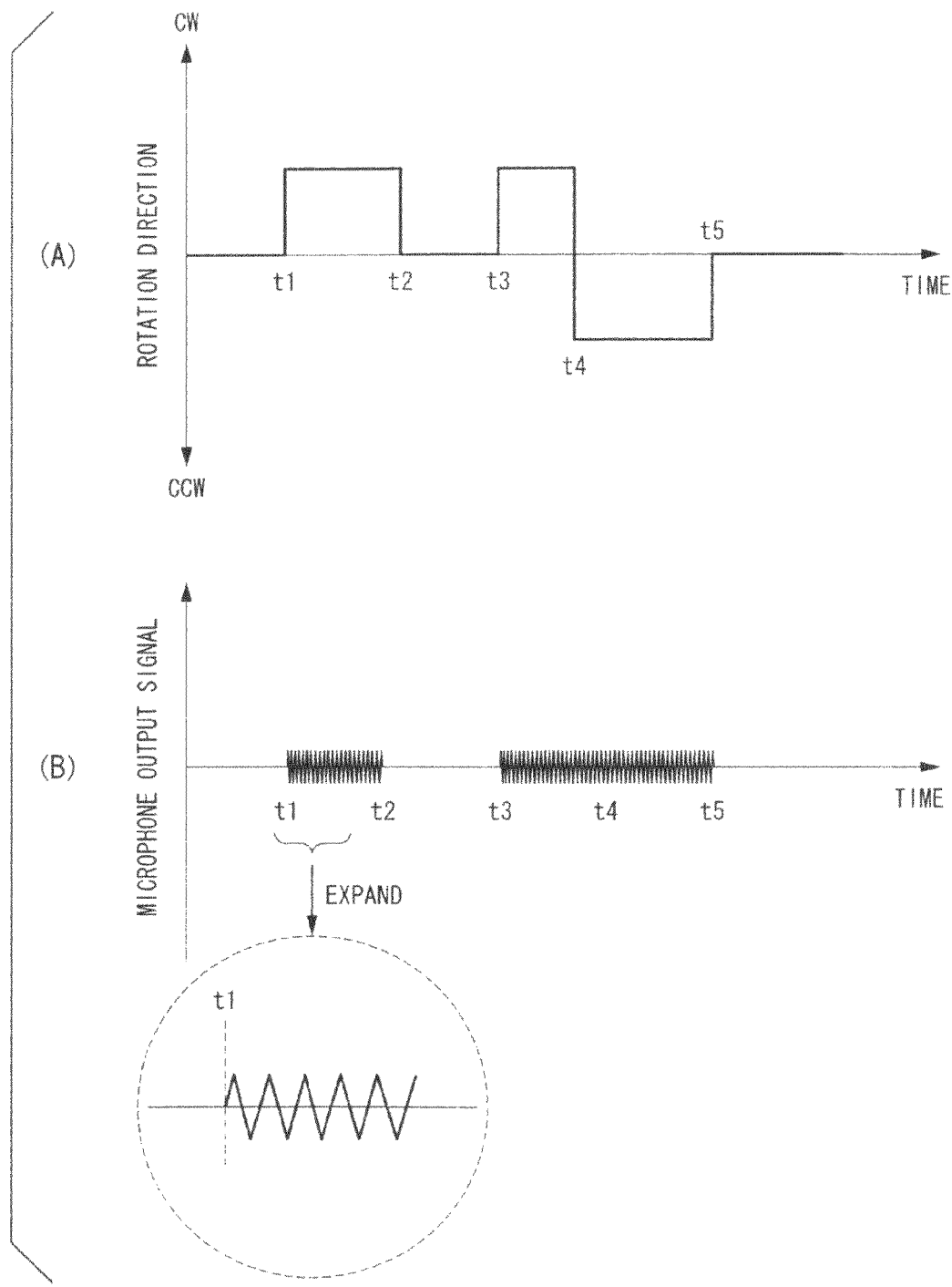
FIG. 2 is a reference diagram for explaining a relationship between a timing signal and operation sound in an imaging device according to an embodiment of the present invention.

In FIG. 2, examples of a relationship between an output of the AF encoder 117 and time, and a relationship between an output of a sound signal having operation sound superimposed thereon and time are shown. For convenience of illustration, in FIG. 2(B), only a sound signal of the operation sound is shown and a sound signal of the target sound is not shown.

In FIG. 2(A), a vertical axis indicates a drive direction of the AF lens 112 as the output of the AF encoder 117. That is, a change in operation state in which the AF lens 112 as the operation unit moves inside the optical system 111 is shown.

In FIGS. 2(A) and 2(B), a horizontal axis indicates time. For example, time t1 indicates timing when the operation of the AF lens 112 is initiated, and time t2 indicates timing when the operation of the AF lens 112 is terminated. Further, time t3 indicates timing when the operation of the AF lens 112 is initiated, time t4 indicates timing when drive direction of the AF lens 112 is reversed, and time t5 indicates timing when the operation of the AF lens 112 is terminated.

That is, in periods of time between t1 and t2 and between t3 and t5, the operation sound is superimposed (generated) on the sound signal or the operation sound is highly likely to be superimposed, as shown in FIG. 2(B). Here, a case in which noise as the operation sound is generated in the periods of time between t1 and t2 and between t3 and t5 will be described below.

Thus, the operation sound generated when the AF lens 112 is in operation is generated in synchronization with timing when the AF lens 112 is in operation. That is, the reduction processing unit 250 determines a portion in which the operation sound is superimposed on the sound signal, or a portion in which the operation sound is highly likely to be superimposed, by using a timing signal detected by the timing signal detection unit 191.

The A/D conversion unit 240 converts a sound signal as an analog signal input from the microphone 230 into a sound signal as a digital signal. The A/D conversion unit 240 outputs the sound signal as a digital signal to the reduction processing unit 250.

The A/D conversion unit 240 may be configured to store the sound signal as a digital signal in the buffer memory unit 130 or the storage medium 200, may store the sound signal temporally associated with the image data acquired by the imaging element 119, or may store a moving image including the sound signal.

The reduction processing unit 250 performs sound signal processing, such as reducing noise as the operation sound, on the sound signal converted into the digital signal by the A/D conversion unit 240, and stores the resultant sound signal in the storage medium 200.

The reduction processing unit 250 includes a sound signal processing unit 251, a noise estimation unit 252, a noise subtraction unit 253, and an inverse Fourier transform unit 254.

The sound signal processing unit 251 weights the sound signal output from the A/D conversion unit 240 by a window function in each prescribed section, converts the sound signal in each section into a spectrum represented in a frequency domain, and outputs the spectrum represented in the frequency domain to the noise estimation unit 252 and the noise subtraction unit 253.

The sound signal processing unit 251 performs, for example, a Fourier transform or fast Fourier transform (FFT) on the sound signal to convert the sound signal into the spectrum in the frequency domain.

Here, the prescribed section is a unit (frame) of signal processing, and may be repeated at uniform intervals. The prescribed section may overlap another prescribed section in order by half. Further, the window function may be, for example, a Hanning window function.

The noise estimation unit 252 calculates operation sound information by the operation unit (hereinafter, referred to as estimated spectrum) based on the spectrum output from the sound signal processing unit 251. The estimated spectrum is a spectrum of a sound signal mainly including the sound signal generated by the operation sound.

The noise estimation unit 252 obtains a spectrum including the sound signal acquired by the microphone 230 when the operation state of the operation unit is changed (hereinafter, referred to as first sound information), based on the timing signal input from the timing signal detection unit 191.

Figure 3:
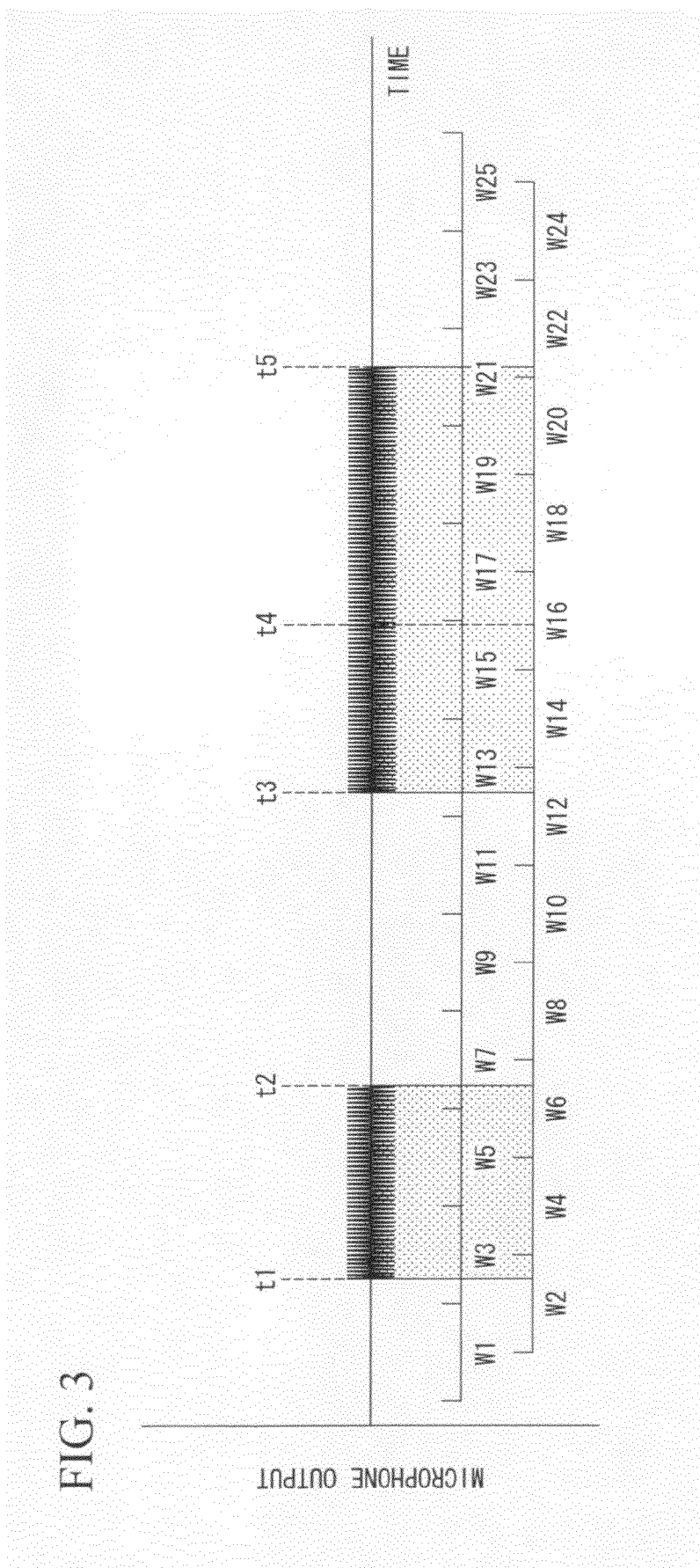
FIG. 3 is a reference diagram for explaining a relationship between obtained sound information and a window function in an imaging device according to an embodiment of the present invention.

Here, the noise estimation unit 252 will be described in detail with reference to FIG. 3. FIG. 3 shows the relationship between a sound signal output and window functions W1 to W25, in which a vertical axis indicates the sound signal output received by the microphone 230, and a horizontal axis indicates time.

As described above, the sound signal output from the A/D conversion unit 240 is weighted by the window functions W1 to W25 overlapping other sections in order by half as shown in FIG. 3, and spectra S1 to S25 in a frequency domain of each section are generated by the sound signal processing unit 251. That is, the spectra S1 to S25 output from the sound signal processing unit 251 are spectra corresponding to the sections of the window functions W1 to W25.

As shown in FIG. 3, the spectra S2 and S3 corresponding to the window functions W2 and W3 are sound information including a timing (t1) when the AF lens 112 initiates its operation, and the spectra S6 and S7 corresponding to the window functions W6 and W7 are sound information including a timing (t2) when the AF lens 112 terminates its operation.

The noise estimation unit 252 detects the spectra S2, S3, S6 and S7 as the first sound information based on the timing signal.

Further, the noise estimation unit 252 calculates an estimated spectrum based on sound signals before and after the sound signal (first sound information) received by the microphone 230 when the operation state of the operation unit is changed based on the timing signal. A sound signal acquired before the sound signal of the first sound information is defined as second sound information, and a sound signal acquired after the sound signal of the first sound information is defined as third sound information.

For example, as shown in FIG. 3, when the spectra S2 and S3 are obtained as the first sound information, the noise estimation unit 252 obtains, as the second sound information, the spectrum S1 based on a sound signal acquired directly before the spectrum S2. The noise estimation unit 252 also obtains, as the third sound information, a spectrum S4 based on the sound signal acquired directly after the spectrum S3.

Further, the noise estimation unit 252 obtains the spectra S2 and S3, which are the first sound information, as sound signals including a timing t1 when the operation of the operation unit is initiated based on the timing signal, and obtains spectra S6 and S7 as sound signals including a timing t2 when the operation of the operation unit is terminated, which corresponds to this initiation timing.

When the spectra S6 and S7 as the first sound information are obtained, the noise estimation unit 252 obtains the spectrum S5 based on a sound signal acquired directly before the spectrum S6, as the second sound information, and obtains the spectrum S8 based on a sound signal acquired directly after the spectrum S7, as the third sound information.

The noise estimation unit 252 determines that a portion in which the operation sound is superimposed in the section (time domain) and a portion in which the operation sound is not superimposed are included in the sound signal detected as the first sound information, based on the timing signal.

Further, the noise estimation unit 252 determines that the operation sound is superimposed, in one entire section (time domain), on the spectra S4 and S5 between the spectra S2 and S3 including the timing t1 when the operation of the operation unit is initiated and the spectra S6 and S7 including the timing t2 when the operation of the operation unit is terminated, based on the timing signal.

Further, when the operation of the same operation unit is initiated following the timing when the operation of the operation unit is terminated, the noise estimation unit 252 obtains spectra S12 and S13 including a timing t3 when the operation of the operation unit is subsequently initiated, based on the timing signal.

When the noise estimation unit 252 obtains the spectra S12 and S13 including the timing t3 when the operation of the operation unit is subsequently initiated, the noise estimation unit 252 determines that operation sound is not superimposed, in one entire section (time domain), on the spectra S8 to S11 between the spectra S6 and S7 including the timing t2 when the operation unit terminates its operation directly before the timing t3 and the spectra S12 and S13.

The noise estimation unit 252 calculates a difference between a spectrum directly before the timing t1 when the operation unit initiates its operation and a spectrum directly after the timing t1 when the operation unit initiates its operation, and outputs an estimated spectrum as the difference to the noise subtraction unit 253.

Figure 4:
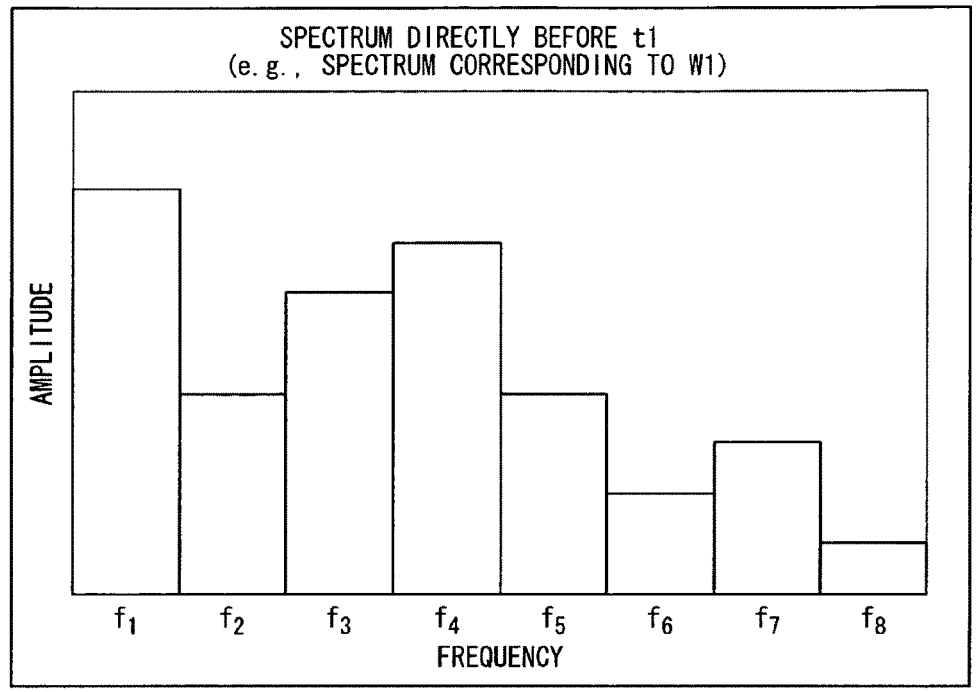
FIG. 4 is a diagram showing a spectrum S1 directly before t1 shown in FIG. 3.
Figure 5:
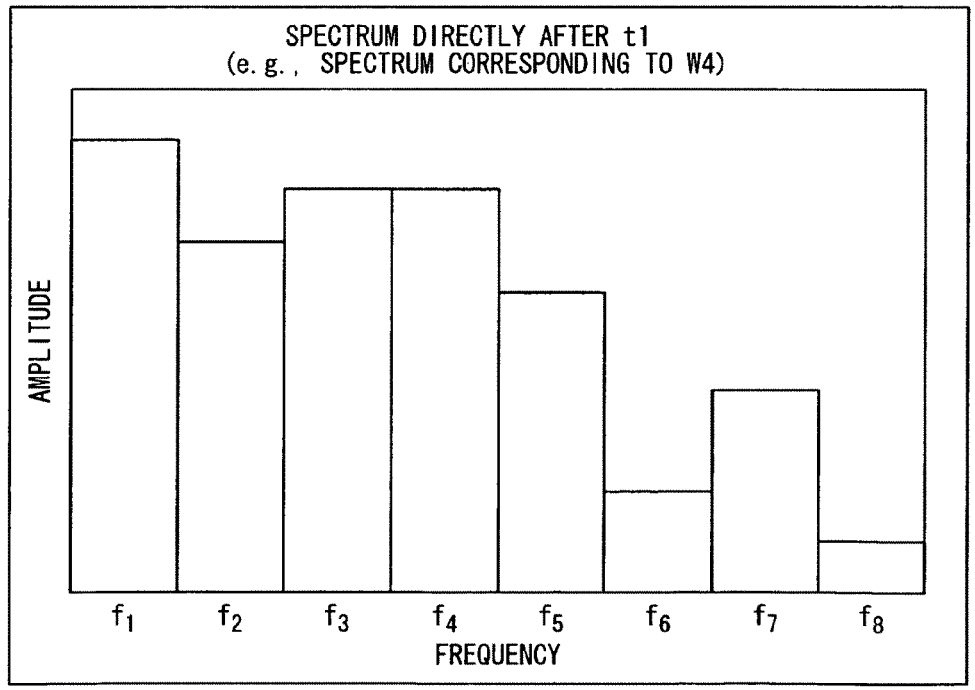
FIG. 5 is a diagram showing a spectrum S4 directly after t1 shown in FIG. 3.

Here, the process will be described in more detail with reference to FIGS. 4 to 6. FIG. 4 shows a spectrum of the spectrum S1 based on a sound signal directly before a sound signal including t1. FIG. 5 shows a spectrum of a spectrum S4 based on a sound signal directly after the sound signal including t1. The spectrum indicates a sound signal represented in a frequency domain, as described above. A horizontal axis indicates frequency and a vertical axis indicates amplitude.

Figure 6:
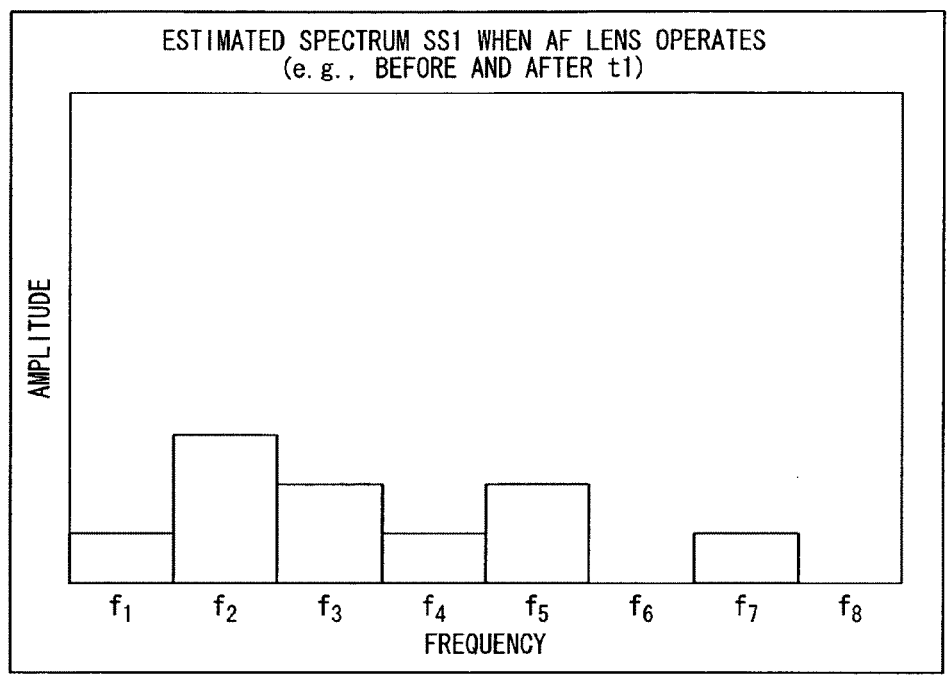
FIG. 6 is a diagram showing an estimated spectrum SS1 obtained based on spectra shown in FIGS. 4 and 5.

Since operation sound is superimposed on the spectrum S4 as shown in FIGS. 4 *and* 5, an estimated spectrum SS1 as shown in FIG. 6 is obtained as a difference by subtracting the spectrum S1 from the spectrum S4.

The noise subtraction unit 253 performs a noise subtraction process to subtract the estimated spectrum input from the noise estimation unit 252 from sound information including the sound signal on which operation sound is superimposed (hereinafter, referred to as fourth sound information), based on the timing signal, and outputs the resultant spectrum to the inverse Fourier transform unit 254.

Figure 7:
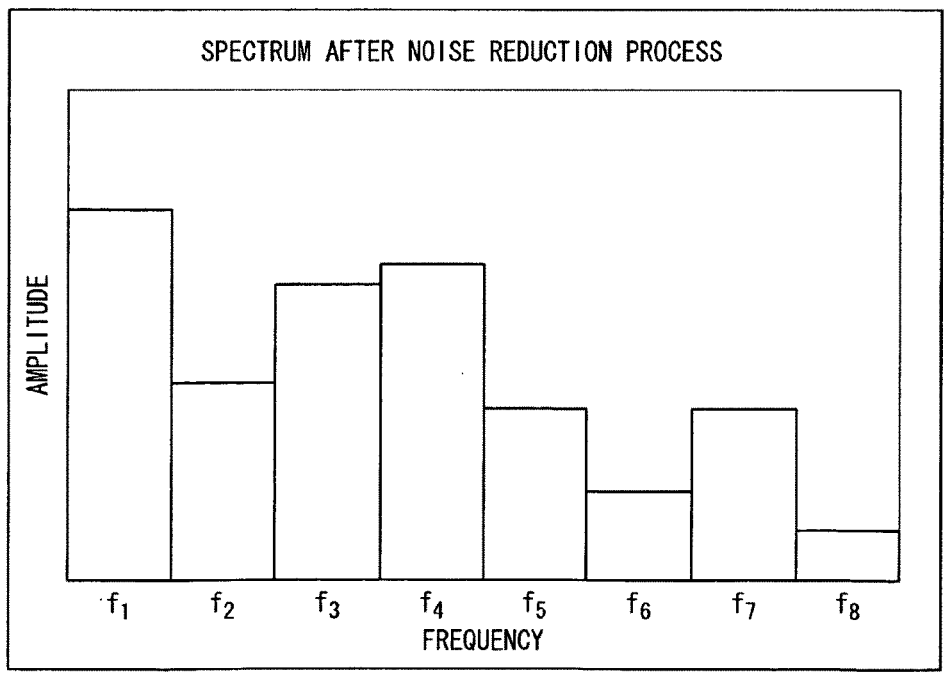
FIG. 7 is a diagram showing a spectrum after a noise reduction process from the spectrum S4 shown in FIG. 5 based on an estimated spectrum SS1 shown in FIG. 6.

For example, the noise subtraction unit 253 detects, as the fourth sound information, a sound signal corresponding between the timing t1 when the operation unit initiates its operation and the timing t2 when the operation unit terminates its operation, based on the timing signal. The noise subtraction unit 253 detects, for example, spectra S4 and S5 as the fourth sound information, and subtracts the estimated spectrum SS1 from each of the spectra S4 and S5 to obtain noise-subtraction-processed spectra s4 and s5. Further, the noise-subtraction-processed spectrum is shown in FIG. 7.

The noise subtraction unit 253 replaces the sound signal corresponding to the fourth sound information with the noise-subtraction-processed sound signal. For example, the noise subtraction unit 253 replaces the spectra S4 and S5 with the noise-subtraction-processed spectra s4 and s5, respectively.

When the noise subtraction unit 253 replaces the fourth sound information with the noise-subtraction-processed sound signal, the noise subtraction unit 253 may perform, for example, crossfading so that connection portions of the sound signals are connected (sequence) to each other.

The inverse Fourier transform unit 254 performs, for example, an inverse Fourier transform or inverse FFT (IFFT) on the spectrum input from the noise subtraction unit 253, for conversion into a time domain.

The inverse Fourier transform unit 254 stores the sound signal converted into the time domain in the storage medium 200. The inverse Fourier transform unit 254 may store the sound signal converted into the time domain and the image data acquired by the imaging element 119 in the storage medium 200, with the sound signal being temporally associated with the image data, or may store a moving image including the sound signal.

When the reduction processing unit 250 obtains the sound signal on which operation sound is not superimposed based on the timing signal, the reduction processing unit 250 may be configured to connect the sound signal on which the operation sound is not superimposed to the sound signal subjected to the noise reduction process and output the resultant sound signal without performing conversion into a frequency domain on the sound signal, or may be configured to perform conversion into a frequency domain, but to connect the sound signal on which the operation sound is not superimposed to the sound signal subjected to the noise reduction process and output the resultant sound signal without performing the noise reduction process.

As described above, the imaging device 100 according to the present embodiment detects the timing when the operation state of the operation unit is changed using the timing signal detection unit 191, and calculates the difference between the sound signal on which the operation sound is superimposed or the operation sound is highly likely to be superimposed, and the sound signal on which operation sound is not superimposed based on the timing signal, to obtain an estimated spectrum for the operation unit. Accordingly, it is possible to subtract the estimated spectrum from the sound signal on which the operation sound is superimposed and reduce operation sound generated when the operation unit is in operation.

Further, the noise estimation unit 252 may obtain, as an estimated spectrum, a difference between the second and third sound information obtained before and after the first sound information, based on the timing signal.

Accordingly, a difference obtained by subtracting a sound signal on which operation sound is not entirely superimposed in one section (time domain), from a sound signal on which operation sound is entirely superimposed in one section (time domain) can be obtained as the estimated spectrum. Thus, it is possible to obtain the estimated spectrum corresponding to the section and subtract from the sound signal divided into sections having the same time length, the estimated spectrum highly likely to be generated in the section. This can increase the accuracy of the noise subtraction process.

Since the target sound included in the second sound information and the target sound included in the third sound information are sound signals temporally changed by tens of msec, the target sounds may be substantially the same. The imaging device 100 according to the present embodiment may calculate, as an estimated spectrum, a difference between the second and third sound information. Accordingly, it is possible to reduce any estimated error of the estimated spectrum and increase the accuracy of the noise subtraction process.

Further, it is preferable for the sound signal processing unit 251 to divide the sound signal as a digital signal into, for example, sections of tens of msec. Thus, the target sounds included in the second and third sound information can be made to be substantially the same, as described above, by setting the length of the section to a small value.

In particular, when sound (voice) is received as the target sound, the sound may often be a signal repeated in relatively equal periods within a short time on the order of tens of msec. For this reason, the target sounds of the second and third sound information become close to each other by setting the length of the section to a small value.

[Noise Reduction Process Using Average Estimated Spectrum Obtained by Averaging Estimated Spectra]

When the operation state of the same operation unit is changed several times based on the timing signal, the noise estimation unit 252 may obtain one estimated spectrum subtracted from the fourth sound information by the noise subtraction unit 253, based on a plurality of estimated spectra obtained at each timing when the operation state is changed.

The noise estimation unit 252 outputs, as an average estimated spectrum, information obtained by averaging an estimated spectrum obtained based on a timing signal indicating the timing when the operation of the operation unit is initiated (hereinafter, referred to as first estimated spectrum) and an estimated spectrum obtained based on a timing signal indicating the timing when the operation of the operation unit is terminated (hereinafter, referred to as second estimated spectrum), to the noise subtraction unit 253.

For example, when spectra S2 and S3 as the first sound information including the timing t1 when the operation of the operation unit is initiated are obtained, the noise estimation unit 252 subtracts the spectrum S1 based on the sound signal acquired directly before the spectrum S2 from the spectrum S4 based on the sound signal acquired directly after the spectrum S3, and obtains the difference as the first estimated spectrum SS1.

Figure 8:
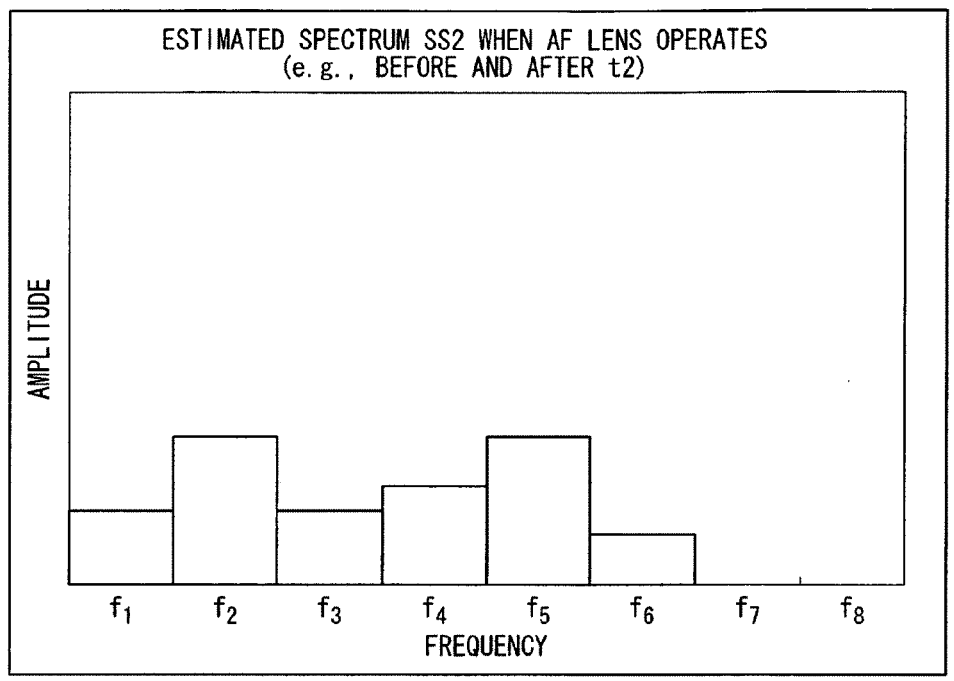
FIG. 8 is a diagram showing an estimated spectrum SS2 corresponding to t2 shown in FIG. 3.

Further, when the spectra S6 and S7 as the first sound information including the timing t2 when the operation of the operation unit is terminated are obtained, the noise estimation unit 252 subtracts the spectrum S8 based on a sound signal acquired directly after the spectrum S7 from the spectrum S5 based on a sound signal acquired directly before the spectrum S6, and obtains the difference as the second estimated spectrum SS2. The second estimated spectrum SS2 is shown in FIG. 8.

Figure 9:
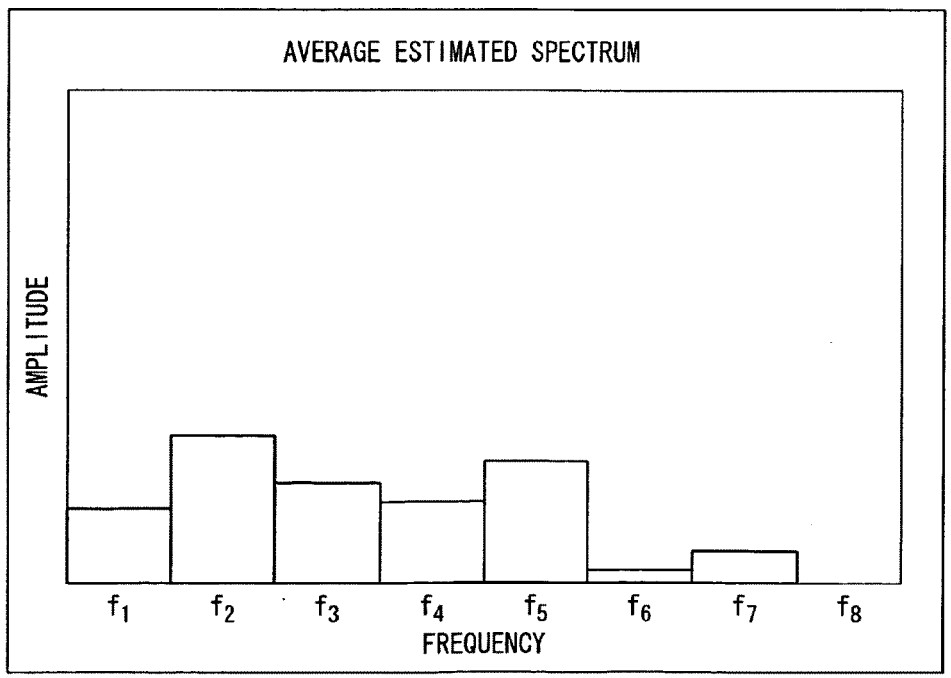
FIG. 9 is a diagram showing an average estimated spectrum based on an estimated spectrum SS1 shown in FIG. 6 and an estimated spectrum SS2 shown in FIG. 8.

The noise estimation unit 252 outputs, as the average estimated spectrum, information that is obtained by averaging the first and second estimated spectra SS1 and SS2 obtained at the start (t1) and end (t2) of a period in which the operation unit continues to operate, respectively, to the noise subtraction unit 253. The average estimated spectrum is shown in FIG. 9.

Figure 10:
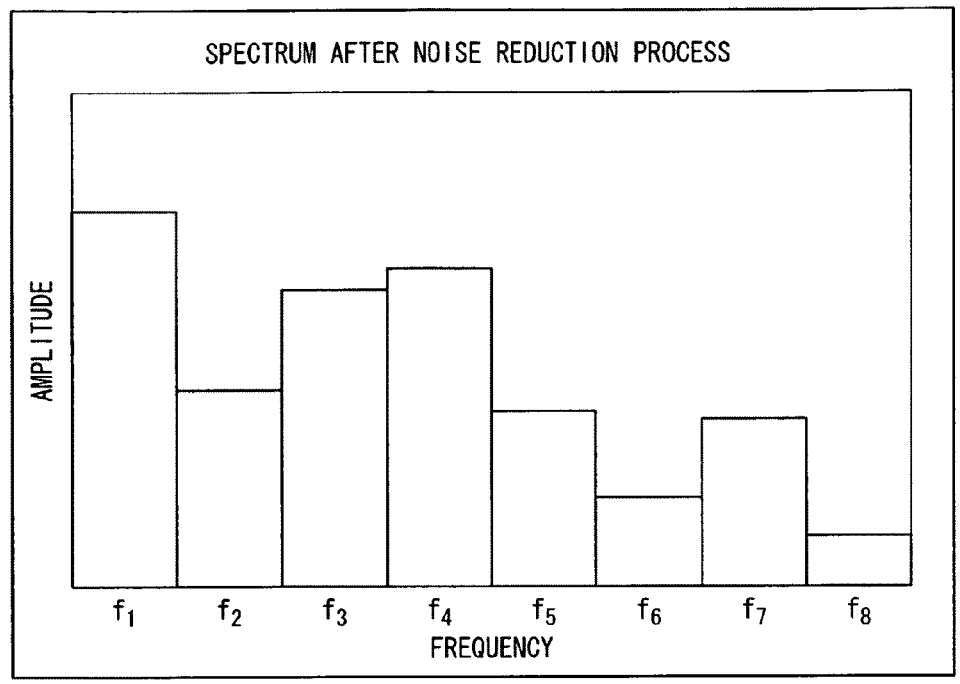
FIG. 10 is a diagram showing a spectrum after a noise reduction process from the spectrum S4 shown in FIG. 5 based on an average estimated spectrum shown in FIG. 9.

The noise subtraction unit 253 performs a noise reduction process by subtracting the average estimated spectrum input from the noise estimation unit 252 from the spectrum S5 (or S4) as the fourth sound information. The spectrum subjected to the noise reduction process is shown in FIG. 10.

There may be a plurality of periods in which the AF lens 112 operates, as shown in FIG. 3.

In this case, the noise estimation unit 252 obtains the first estimated spectra SS1 and SS3, which are obtained at the timings t1 and t3 when the operation unit initiates its operation, and the second estimated spectra SS2 and SS5, which are obtained at the timings t2 and t5 when the operation unit terminates its operation.

Figure 11:
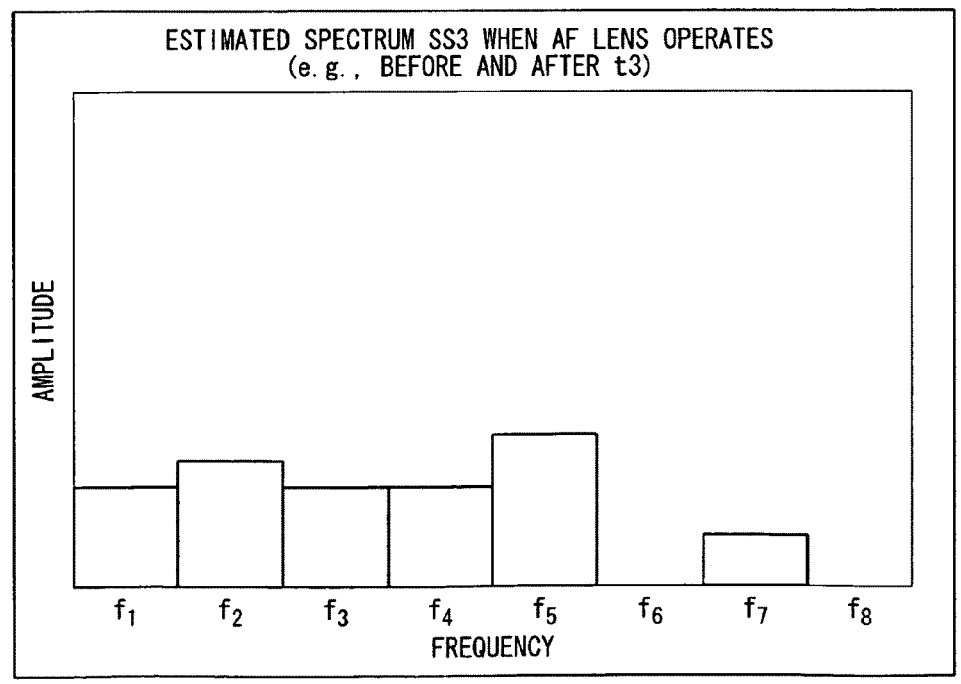
FIG. 11 is a diagram showing an estimated spectrum SS3 corresponding to t3 shown in FIG. 3.

For example, when the spectra S12 and S13 as the first sound information including the timing t3 when the operation of the operation unit is initiated are obtained, the noise estimation unit 252 subtracts the spectrum S11 based on the sound signal acquired directly before the spectrum S12 from the spectrum S14 based on the sound signal acquired directly after the spectrum S13, and obtains the resultant difference as a first estimated spectrum SS3. Further, the first estimated spectrum SS3 is shown in FIG. 11.

Figure 12:
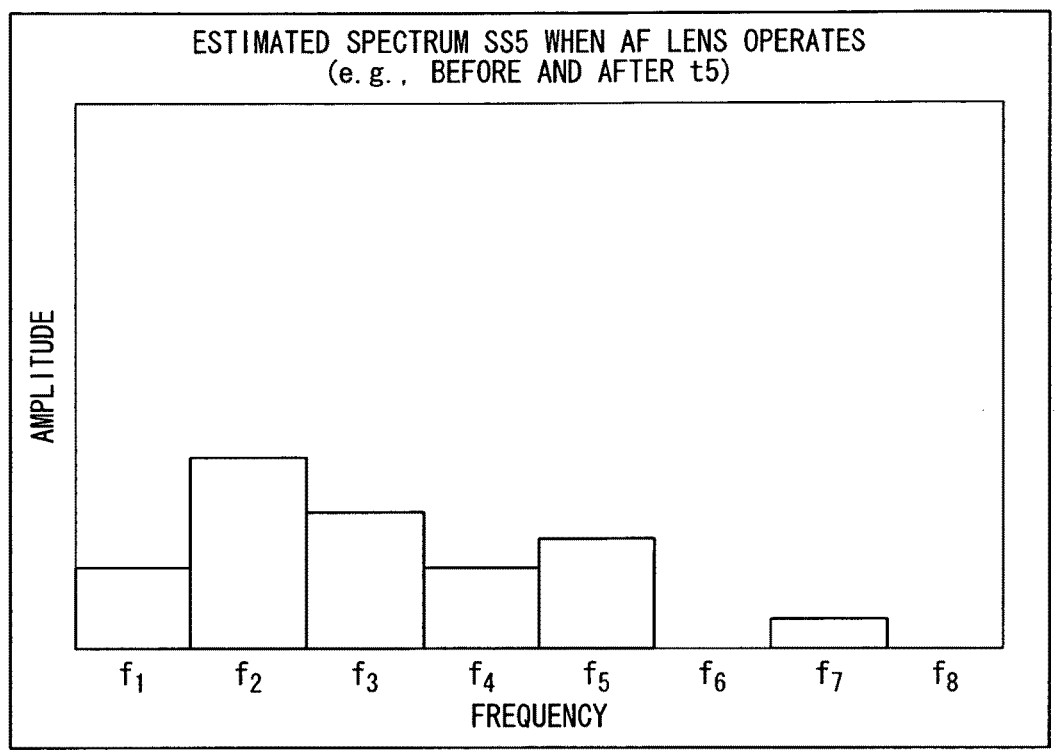
FIG. 12 is a diagram showing an estimated spectrum SS4 corresponding to t4 shown in FIG. 3.

Further, when the spectra S21 and S22 as the first sound information including timing t5 when the operation of the operation unit is terminated are obtained, the noise estimation unit 252 subtracts the spectrum S23 based on the sound signal acquired directly after the spectrum S22 from the spectrum S20 based on the sound signal acquired directly before the spectrum S21, and obtains the resultant difference as second operation sound information SS5. Further, the second estimated spectrum SS5 is shown in FIG. 12.

The noise estimation unit 252 averages the first estimated spectra (e.g., SS1 and SS3) obtained at the timing when the operation unit initiates its operation among the plurality of estimated spectra (e.g., SS1 to SS3, SS5), averages the second estimated spectra (e.g., SS2 and SS5) obtained at the timing when the operation unit initiates its operation, or averages at least two of both the first and second estimated spectra (e.g., SS1 to SS3, and SS5), to obtain the average estimated spectrum.

Thus, it is possible to reduce any estimated error included in each of a plurality of estimated spectra by using the average estimated spectrum obtained by averaging based on the plurality of estimated spectra, thereby increasing accuracy of the noise subtraction process.

Further, the noise estimation unit 252 may be configured to associate the calculated estimated spectrum with the timing indicated by the timing signal and temporary store the estimated spectrum, for example, in the buffer memory unit 130.

In this case, the noise subtraction unit 253 may be configured to perform the noise subtraction process based on the estimated spectrum output from the noise estimation unit 252. In this case, since time is unnecessary to read a previous sound signal from the buffer memory unit 130 and calculate an estimated spectrum, it is possible to shorten the time required for the noise subtraction process.

Further, the noise subtraction unit 253 may be configured to read the estimated spectrum temporary stored in the buffer memory unit 130 and perform the noise subtraction process.

For example, the noise subtraction unit 253 may be configured to perform the noise reduction process on the spectra S4 and S5 using the estimated spectrum SS1 read from the buffer memory unit 130 and perform the noise reduction process on the spectra S14 to S20 using an average estimated spectrum based on the estimated spectra SS1 to SS3 read from the buffer memory unit 130.

<Obtaining Average Estimated Spectrum by Excluding Abnormal Value (Outlier) from a Plurality of Estimated Spectra>

Further, the noise estimation unit 252 may average spectra other than a maximum estimated spectrum having maximum amplitude and a minimum estimated spectrum having minimum amplitude at each frequency among a plurality of estimated spectra to obtain the average estimated spectrum.

For example, when the spectrum includes frequencies f1 to f8 as shown in FIGS. 6, 8, 11, and 12, the noise estimation unit 252 averages spectra other than a maximum estimated spectrum as a spectrum having the greatest amplitude and a minimum estimated spectrum as a spectrum having the smallest amplitude among the estimated spectra SS1, SS2, SS3 and SS5 at each of the frequencies f1 to f8.

The noise estimation unit 252 obtains information obtained by averaging the spectra other than the maximum estimated spectrum and the minimum estimated spectrum, at each of frequencies f1 to f8, and connects all the averaged information corresponding to the respective frequencies f1 to f8 to obtain the average estimated spectrum.

Using such a configuration, even when the estimated spectra greatly deviating from the average estimated spectrum are included in a plurality of estimated spectra, accuracy of the average estimated spectrum can be greatly increased by excluding the greatly deviating maximum and minimum estimated spectra.

Thus, each of the maximum estimated spectrum and the minimum estimated spectrum excluded from the plurality of estimated spectra are not limited to one, but a plurality of spectra having a larger amplitude may be selected as the maximum estimated spectrum in order, and a plurality of spectra having a smaller amplitude may be selected as the minimum estimated spectrum in order.

<Obtaining Average Estimated Spectrum Based on a Plurality of Estimated Spectra Weighted According to Time>

Further, the noise estimation unit 252 may average values obtained by weighting a plurality of estimated spectra based on the time when the sound signal based on the estimated spectrum is received, to obtain the average estimated spectrum.

When the sound signal is received by the microphone 230, the reduction processing unit 250 obtains time information indicating the date when the sound signal is received, from the clock unit 220, and associates the time information with the sound signal.

The sound signal processing unit 251 converts the sound signal with which the time information is associated, into a spectrum, and outputs the spectrum to the noise estimation unit 252.

The noise estimation unit 252 calculates an estimated spectrum based on the spectrum with which time information is associated, and associates the time information indicating the time when the sound signal based on the estimated spectrum is received, with the obtained estimated spectrum, based on the time information associated with the spectrum.

The noise estimation unit 252 also stores the time information in the storage unit 160 or the storage medium 200, with the time information being associated with the estimated spectrum.

The noise estimation unit 252 reads the estimated spectrum with which the time information stored in the storage unit 160 or the storage medium 200 is associated, lightly weights the estimated spectrum with which older time information is associated and heavily weights an estimated spectrum with which newer time information is associated, based on the time information, and averages the weighted values to obtain the average estimated spectrum.

The noise estimation unit 252 may be configured to not perform on estimated spectra that are old over a prescribed period, such as one month, ten months, or one week.

<Obtaining Average Estimated Spectrum Based on a Plurality of Estimated Spectra Weighted According to S/N Ratio>

Further, the noise estimation unit 252 may average values obtained by weighting a plurality of estimated spectra based on the S/N ratio to obtain the average estimated spectrum.

The S/N ratio is, for example, a ratio in which a spectrum on which the operation sound is not entirely superimposed in a section (time domain) represented by one frame is divided by the estimated spectrum. That is, a spectrum according to a sound signal received when the operation unit is not in operation, is a value obtained by taking any one of spectra between a spectrum S7, which is the first sound information upon operation termination, and a spectrum S12, which is the first sound information upon operation initiation, such as the spectra S8 to S11, as the numerator and taking the estimated spectrum as the denominator.

For example, when the S/N ratio corresponding to the timing t1 is calculated, the S/N ratio is calculated by dividing the spectrum S1 by the estimated spectrum SS1.

Similarly, the S/N ratios of timings t2, t3 and t5 are calculated as a S/N ratio obtained by dividing the spectrum S8 by the estimated spectrum SS2, a S/N ratio obtained by dividing the spectrum S11 by the estimated spectrum SS3, and a S/N ratio obtained by dividing the spectrum S23 by an estimated spectrum SS5, respectively.

The noise estimation unit 252 averages values obtained by weighting corresponding estimated spectra SS1 to SS3 and SS5 by weights according to the S/N ratios to obtain the average estimated spectrum. For example, when the S/N ratio is high, a lighter weight is assigned and when the S/N ratio is small, a heavier weight is assigned.

Thus, an estimated spectrum obtained when the target sound is small can be emphasized through weighting according to the S/N ratio. Accordingly, it is possible to reduce any estimated error of the estimated spectrum and increase the accuracy of the noise subtraction process.

[Noise Reduction Process Using One Selected from Among a Plurality of Estimated Spectra]

Further, the noise estimation unit 252 may be configured to select a maximum estimated spectrum having maximum amplitude at each frequency, or a minimum estimated spectrum having minimum amplitude at each frequency from among a plurality of estimated spectra, and output the selected estimated spectrum to the noise subtraction unit 253.

In this case, the noise estimation unit 252 may be configured to select the minimum estimated spectrum and output the minimum estimated spectrum to the noise subtraction unit 253 when a value obtained by averaging S/N ratios obtained at the respective estimated spectra as described above is equal to or greater than a prescribed threshold value.

Further, the noise estimation unit 252 may be configured to select the maximum estimated spectrum and output the maximum estimated spectrum to the noise subtraction unit 253 when the value obtained by averaging S/N ratios obtained at the respective estimated spectra is smaller than the prescribed threshold value.

That is, when the S/N ratio is high, the noise subtraction process is performed using the minimum estimated spectrum, thereby realizing a noise subtraction process emphasized for securing quality of the target sound.

Meanwhile, when the S/N ratio is small, the noise subtraction process is performed using the maximum estimated spectrum, thereby realizing a noise subtraction process emphasized for the reduction of operation sound.

[Details of Reduction Processing Unit 250]

The noise subtraction unit 253 executes, in the frequency domain, the noise reduction process for a spectrum corresponding to the fourth sound information, for example, using a spectrum subtraction method, to reduce noise resulting from the operation sound.

For example, technology disclosed in the following document is available.

Suppression of Acoustic Noise in Speech Using Spectral Subtraction STEVEN F. BOLL 1979.

As described above, the noise subtraction unit 253 performs the noise subtraction process on spectra of each section to subtract, in a frequency domain, the estimated noise, thereby reducing the noise resulting from the operation sound.

Here, when the noise is generated in only a portion of one section and the estimated spectrum is directly subtracted in the section, the noise resulting from the operation sound may be excessively reduced. For this reason, the noise subtraction unit 253 may weight the estimated spectrum by the subtraction coefficient and subtract, in a frequency domain, the weighted estimated spectrum from the spectrum weighted by the window function. The subtraction coefficient corresponding to a prescribed section is determined as described below, according to a relative position between a window function corresponding to the section and timing (e.g., t1) when the operation state of the operation unit is changed.

Figure 13:
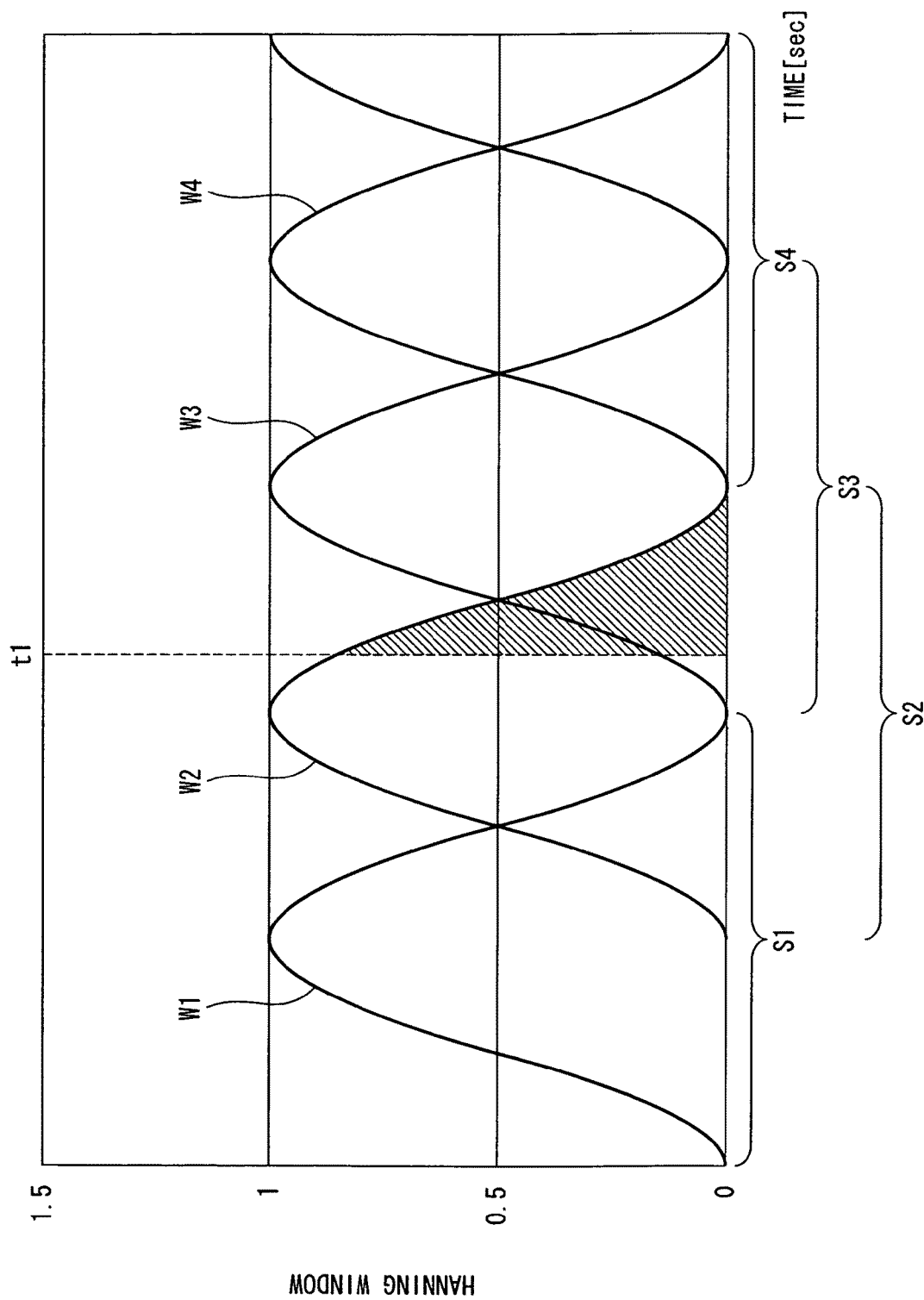
FIG. 13 is a diagram showing one example of a positional relationship between t1 shown in FIG. 3 and a Hanning window function.
Figure 14:
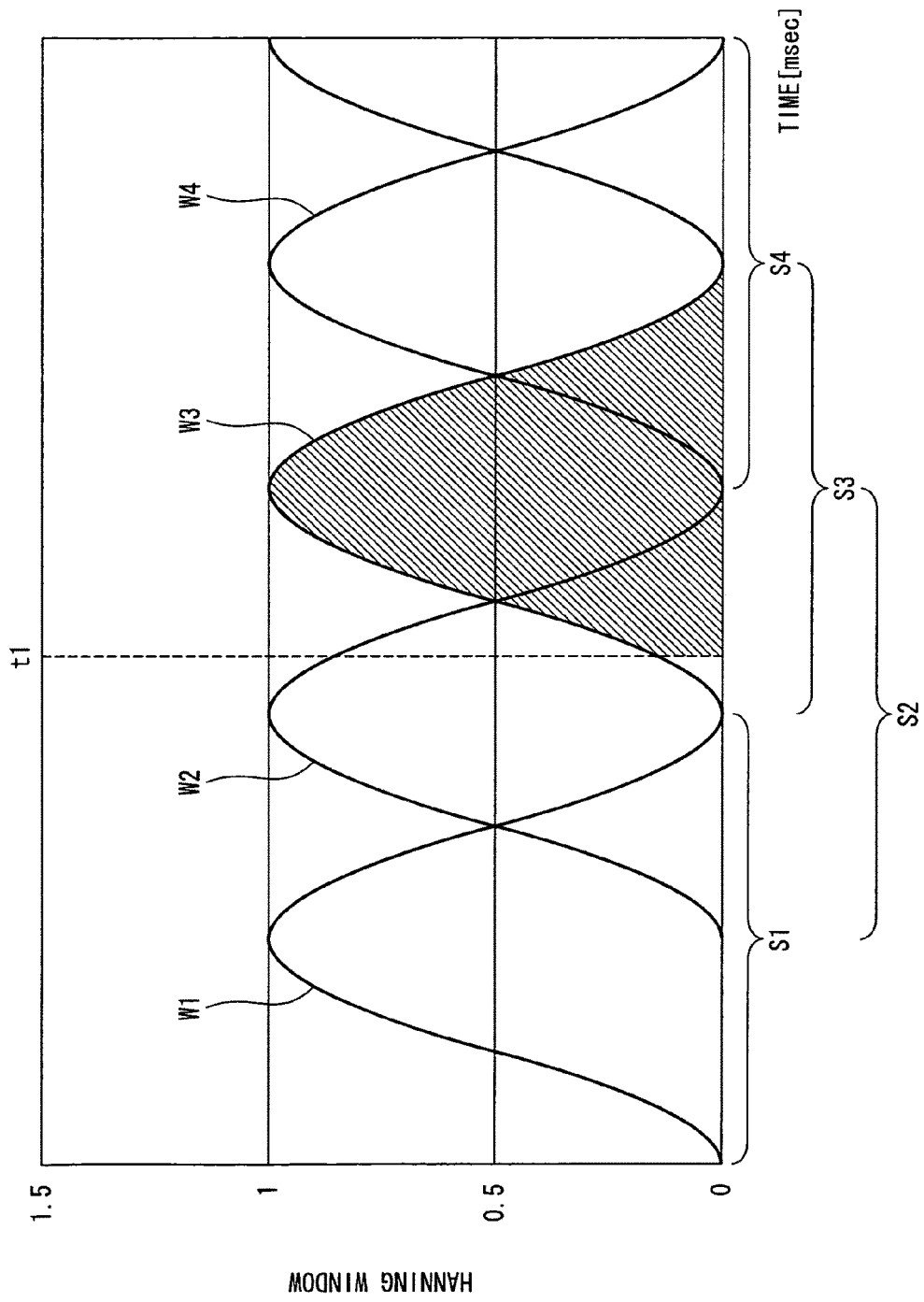
FIG. 14 is a diagram showing one example of a positional relationship between t1 shown in FIG. 3 and a Hanning window function.
Figure 15:
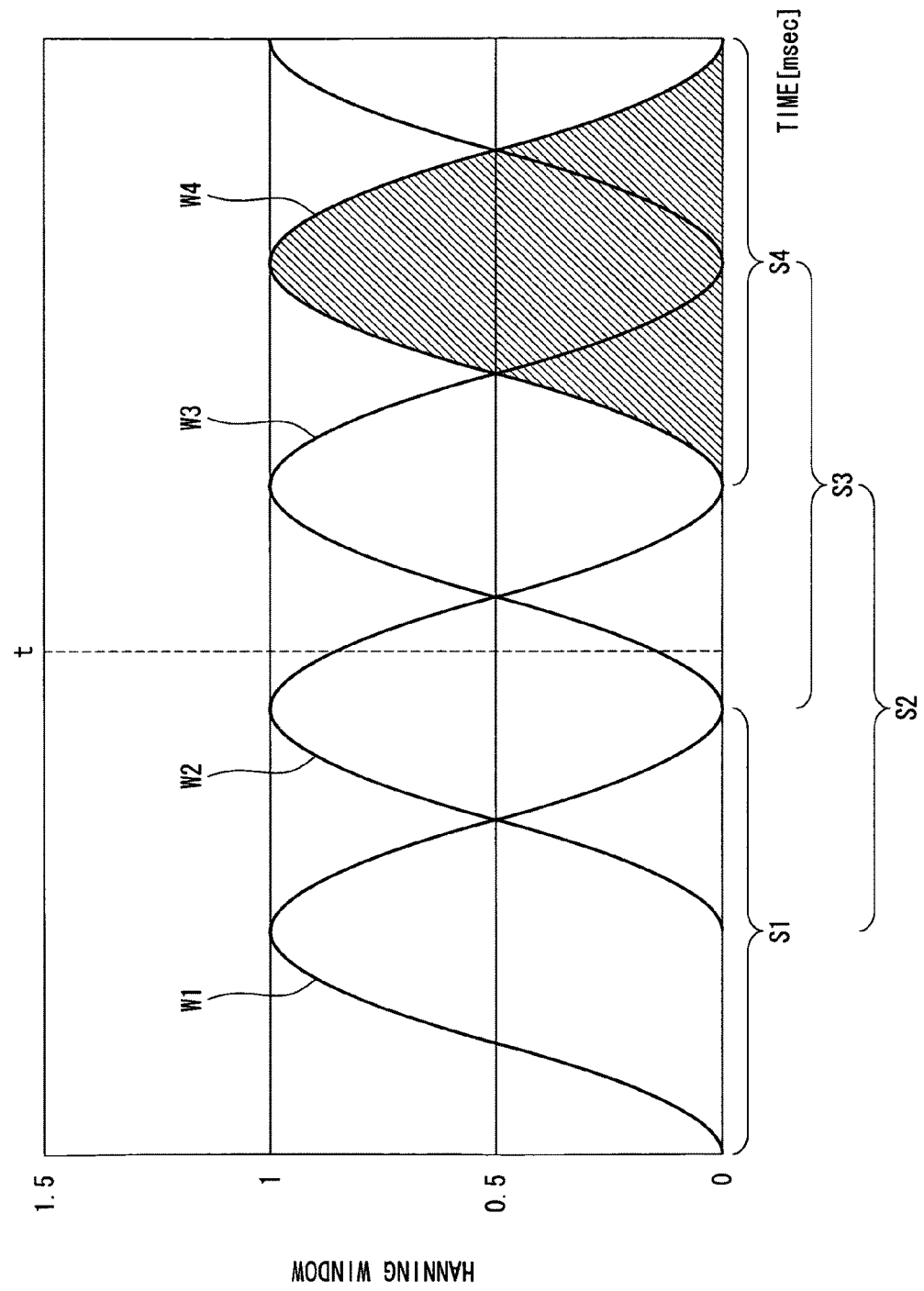
FIG. 15 is a diagram showing one example of a positional relationship between t1 shown in FIG. 3 and a Hanning window function.

Hereinafter, the window function will be described, for example, as a Hamming window function. In FIGS. 13 to 15, examples of a positional relationship between spectra S2 and S3 (first sound information) including a timing t1, a spectrum S1 directly before the spectrum S2 (second sound information), a spectrum S4 directly after the spectrum S3 (third sound information), and window functions W1 to W4 are shown.

For example, in the example shown in FIG. 13, since the spectrum S1 does not include time t1 but is located before time t1, the subtraction coefficient corresponding to the spectrum S1 may be determined according to the relative position.

Further, since the spectrum S2 includes the time t1, a subtraction coefficient corresponding to the spectrum S2 may be determined based on a ratio of an area of the window function W2 in the spectrum S2 and an area of the window function W2 after the time t1 (a portion indicated by oblique lines in FIG. 13). The same applies to a subtraction coefficient corresponding to the spectrum S3 (see FIG. 14).

In FIG. 15, since a spectrum S4 does not include time t1 but is located after the time t1, a subtraction coefficient corresponding to the spectrum S4 may be determined according to a relative position.

The subtraction coefficient is determined by the noise subtraction unit 253 according to a relative positional relationship between the timing when the operation state of the operation unit is changed and the window function. Even in the timing (e.g., t2) when the operation unit terminates its operation, the subtraction coefficient may be similarly determined based on a ratio of an area of the window function at the spectrum and an area of the window function before a time t2.

Figure 16:
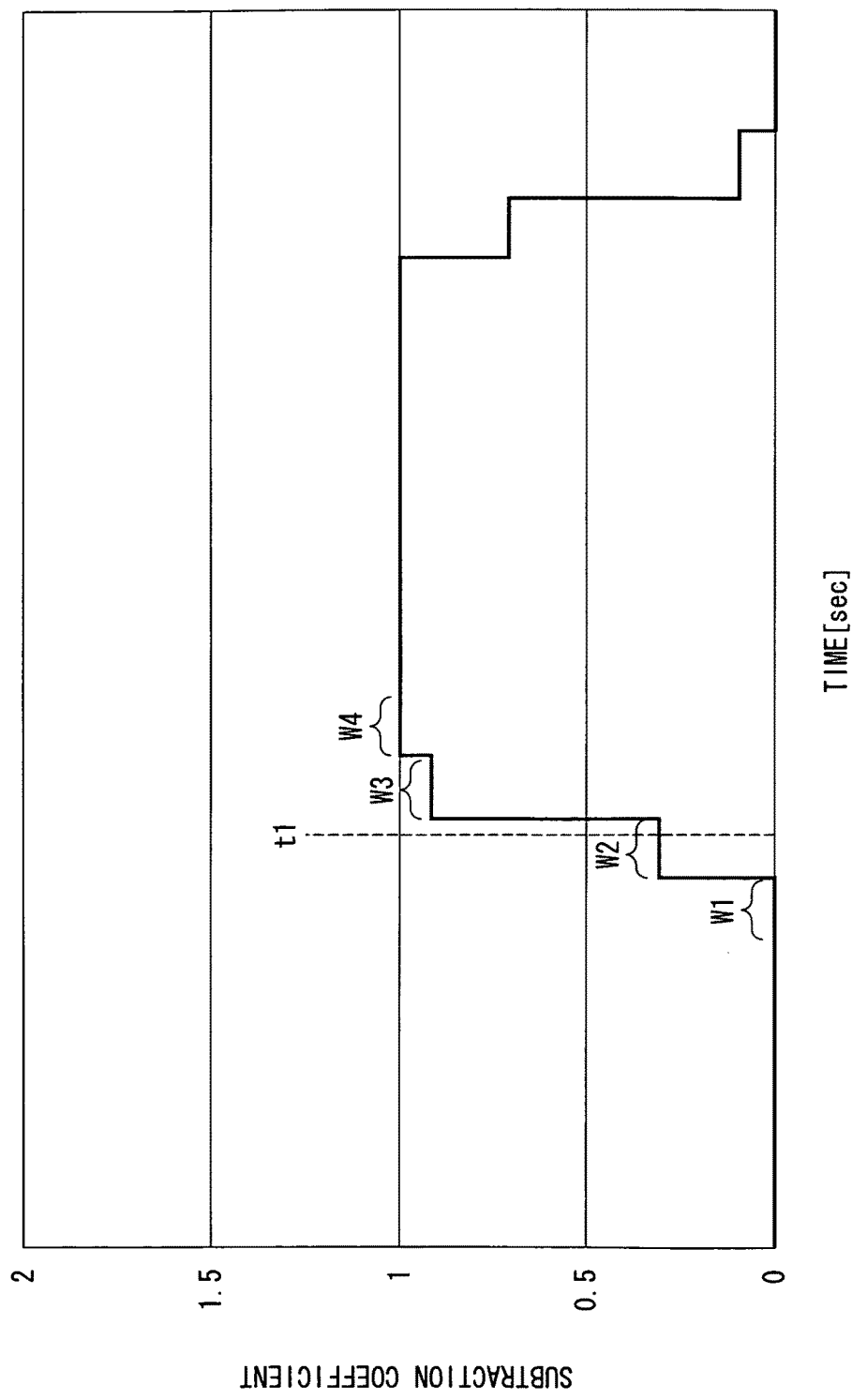
FIG. 16 is a diagram showing one example of a subtraction coefficient used in an imaging device according to an embodiment of the present invention.

In FIG. 16, one example of the determined subtraction coefficient is shown. In the examples shown in FIGS. 13 to 15, for example, the subtraction coefficient corresponding to the spectrum S1 has a value "0", the subtraction coefficient corresponding to the spectrum S2 has a value "0.3", the subtraction coefficient corresponding to the spectrum S3 has a value "0.9", and the subtraction coefficient corresponding to the spectrum S4 has a value "1". Each value is one example.

Figure 17:
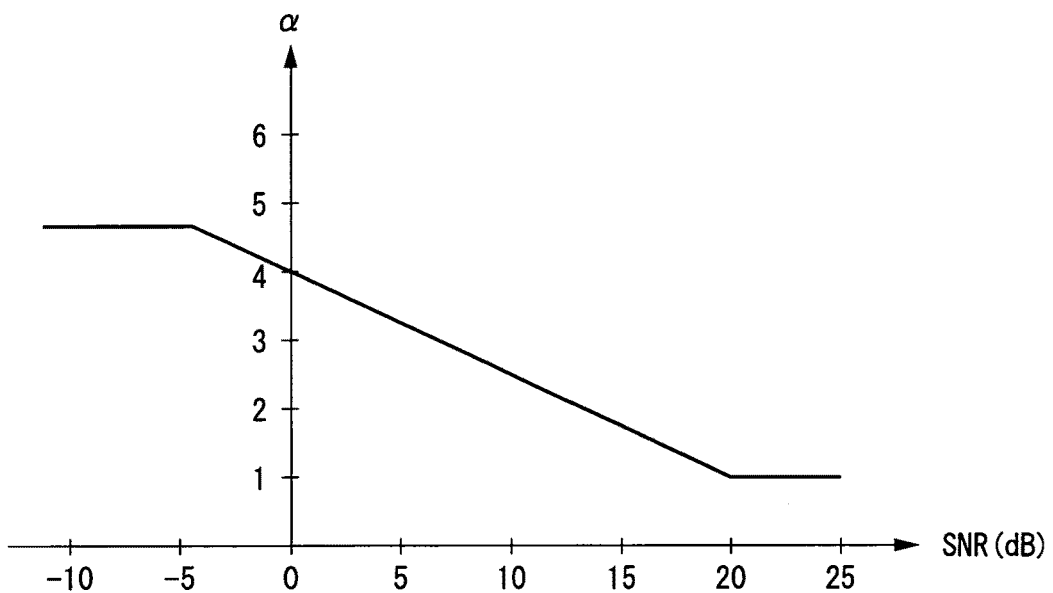
FIG. 17 is a diagram for explaining a subtraction coefficient used in an imaging device according to an embodiment of the present invention.

The subtraction coefficient is determined based on a ratio (hereinafter, referred to as $SNR_i$ (dB)) of a size of a spectrum of each frame (i.e., frequency output) and a size of the estimated spectrum (i.e., frequency output), as shown in FIG. 17. FIG. 17 is a diagram showing a relationship between the ratio $SNR_i$ (dB) and the subtraction coefficient $\alpha_i$.

As shown in FIG. 17, the subtraction coefficient $\alpha_i$ is reduced from a value "5" to a value "1" between a value "−5" and a value "20" of the ratio $SNR_i$ (dB).

The ratio $SNR_i$ (dB) may be represented by the following equation:

$$SNR_i(dB) = 10\log_{10}\left(\frac{\sum_{k=b_i}^{e_i}|Y_i(k)|^2}{\sum_{k=b_i}^{e_i}|\hat{D}_i(k)|^2}\right) \quad \text{Equation 1}$$

$Y_i$ denotes a spectrum of each frame, $D_i$ denotes an estimated spectrum, and i denotes each frame.

Further, a relationship between the subtraction coefficient $\alpha_i$ and the ratio $SNR_i$ (dB) may be represented by the following equation:

$$\alpha_i = \begin{cases} 5 & SNR_i < -5 \\ 4 - \frac{3}{20}(SNR_i) & -5 \leq SNR_i \leq 20 \\ 1 & SNR_i > 20 \end{cases} \quad \text{Equation 2}$$

Accordingly, the noise subtraction unit 253 may calculate the subtraction coefficient $\alpha_i$ according to the ratio $SNR_i$ (dB), weight the estimated spectrum by the subtraction coefficient $\alpha_i$, and subtract, in the frequency domain, the weighted estimated spectrum from the spectrum weighted by the window function.

Thus, even when noise is generated in only a portion of one section, it is possible to prevent noise resulting from the operation sound from being excessively reduced, and sufficiently secure the target sound.

The present invention is not limited thereto, but the noise subtraction unit 253 may calculate a suppression coefficient based on a spectrum in which operation sound is superimposed on the sound signal and the estimated spectrum, and weight a spectrum in which operation sound is superimposed on the sound signal based on the suppression coefficient.

For example, the sound signal received by the microphone 230 may be output to the A/D conversion unit 240 and then temporary stored in the buffer memory unit 130 or stored in the storage medium 200. The sound signal read from the buffer memory unit 130 or the storage medium 200 may be processed by the reduction processing unit 250. In this case, a device load (e.g., delay of processing time) in real-time processing can be reduced.

Further, a program for realizing the process by the timing signal detection unit 191, the reduction processing unit 250 or the like may be recorded in a computer-readable recording medium, and the program recorded in the recording medium may be read and executed by a computer system to perform an execution process. The "computer system" noted herein may include an operating system (OS) and hardware such as peripheral devices.

Further, the "computer system" includes a homepage provision environment (or a display environment) only if the environment uses a WWW system. Further, the "computer-readable recording medium" includes a storage device, such as a flexible disk, a magneto-optical disk, a ROM, a writable non-volatile memory such as a flash memory, a portable medium such as a CD-ROM, or a hard disk embedded in the computer system.

Further, the "computer-readable recording medium" includes a medium for holding a program for a certain period of time, such as a volatile memory (e.g., dynamic random access memory; DRAM) inside a computer system configured of a server and a client when the program is transmitted via a network such as the Internet or a communication line such as a telephone line.

Further, the program may be transmitted from a computer system storing the program in a storage device to other computer systems via a transmission medium or by a transmission wave in the transmission medium. Here, the "transmission medium" transmitting the program is a medium having a function of transmitting information, such as a network (communication network) such as the Internet or a communication line such as a telephone line.

Further, the program may be a program for realizing a portion of the above-described function. Further, the program may be a program capable of realizing the above-described function through a combination with a program recorded in the computer system, i.e., may be a difference file (difference program).

What is claimed is:

1. An imaging device comprising:
    an imaging unit that images an optical image by an optical system;
    a timing signal detection unit that detects a signal indicating a timing of when an operation unit is in operation;
    a sound signal acquisition unit that acquires a sound signal;
    a calculation unit that calculates, in a case where first sound information corresponds to a section including a sound signal where the operation state of the operation unit is changed based on the signal indicating the timing, operation sound information of the operation unit based on a difference between second sound information corresponding to a section including a sound signal before the first sound information and third sound information corresponding to a section including a sound signal after the first sound information; and
    a processing unit that subtracts the operation sound information from fourth sound information which corresponds to a section including a sound signal including an operation sound of the operation unit and is acquired based on the signal indicating the timing detected by the timing signal detection unit.

2. The imaging device according to claim 1, wherein the calculation unit acquires sound information including a sound signal acquired by the sound signal acquisition unit when the operation unit initiates its operation, as the first sound information upon operation initiation, and calculates first operation sound information as the operation sound information based on the second sound information based on a sound signal acquired directly before the first sound information upon operation initiation and the third sound information based on a sound signal acquired directly after the first sound information upon operation initiation.

3. The imaging device according to claim 2, wherein the calculation unit acquires sound information including a sound signal acquired by the sound signal acquisition unit when the operation unit terminates its operation, as the first sound information upon operation termination, and calculates first operation sound information as the operation sound information based on the second sound information based on a sound signal acquired directly before the first sound information upon operation termination and the third sound information based on a sound signal acquired directly after the first sound information upon operation termination.

4. The imaging device according to claim 3, wherein the processing unit subtracts information obtained by averaging the first and second operation sound information, as the operation sound information, from the fourth sound information.

5. The imaging device according to claim 4, wherein the processing unit obtains the averaged information based on frequency spectra other than a maximum value and a minimum value of each frequency for frequency spectra included in the first and second operation sound information, and subtracts the averaged information, as the operation sound information, from the fourth sound information.

6. The imaging device according to claim 4, wherein the processing unit stores time information indicating the time when a sound signal including each of the first and second operation sound information is received, in a storage unit, the time information being associated with the first and second operation sound information, and subtracts information obtained by averaging values obtained by weighting the first and second operation sound information based on the time information, as the operation sound information, from the fourth sound information.

7. The imaging device according to claim 4, wherein the processing unit subtracts information obtained by averaging values obtained by weighting the first and second operation sound information, as the operation sound information, from the fourth sound information, based on a ratio in which sound information resulting from the sound signal acquired when the operation unit is not in operation is divided by the operation sound information.

8. The imaging device according to claim 1, wherein the processing unit subtracts a maximum value or a minimum value of amplitude of each frequency for frequency spectra included in the operation sound information, as the operation sound information, from the fourth sound information.

9. The imaging device according to claim 8, wherein the noise processing unit uses the minimum value as the noise information when a ratio in which sound information resulting from the sound signal acquired when the operation unit is not in operation is divided by the operation sound information, is smaller than a prescribed threshold value, and uses the maximum value as the noise information when the ratio is equal to or greater than the threshold value.

10. The imaging device according to claim 1, wherein the processing unit subtracts a value obtained by multiplying the operation sound information by a coefficient according to a portion of the window function corresponding to the section including the operation sound of the operation unit in the first sound information based on a signal indicating the timing, from the fourth sound information.

11. The imaging device according to claim 1, wherein:
the section corresponding to the fourth sound information is defined between a timing when an operation by the operation unit starts and a timing when the operation by the operation unit ends.

* * * * *

UNITED STATES PATENT AND TRADEMARK OFFICE
CERTIFICATE OF CORRECTION

| | | |
|---|---|---|
| PATENT NO. | : 8,860,822 B2 | Page 1 of 1 |
| APPLICATION NO. | : 12/915412 | |
| DATED | : October 14, 2014 | |
| INVENTOR(S) | : Matsumoto et al. | |

It is certified that error appears in the above-identified patent and that said Letters Patent is hereby corrected as shown below:

On the Title Page:

Item (75), in the residence for the second inventor delete "Tokyo (JP)" and insert --Saitama (JP)--, therefor.

Signed and Sealed this
Eighth Day of September, 2015

Michelle K. Lee
*Director of the United States Patent and Trademark Office*